US011207751B2

(12) United States Patent
Puidokas et al.

(10) Patent No.: US 11,207,751 B2
(45) Date of Patent: Dec. 28, 2021

(54) METHOD OF REPAIRING SUPERALLOYS

(71) Applicant: General Electric Company, Schenectady, NY (US)

(72) Inventors: Sabrina Michelle Puidokas, Baden (CH); Fabrizio Mangano, Dottikon (CH)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 16/028,016

(22) Filed: Jul. 5, 2018

(65) Prior Publication Data
US 2019/0047094 A1 Feb. 14, 2019

(30) Foreign Application Priority Data
Aug. 11, 2017 (EP) .................................... 17185841

(51) Int. Cl.
*B23P 6/04* (2006.01)
*B23K 1/00* (2006.01)
(Continued)

(52) U.S. Cl.
CPC ............ *B23P 6/045* (2013.01); *B23K 1/0018* (2013.01); *B23K 1/206* (2013.01); *B23K 26/0006* (2013.01); *B23K 26/0622* (2015.10); *B23K 26/32* (2013.01); *B23K 26/34* (2013.01); *B23K 26/342* (2015.10); *B23K 26/60* (2015.10); *B23K 31/12* (2013.01); *B23K 31/125* (2013.01); *B23K 35/3033* (2013.01); *B23P 6/007* (2013.01); *F01D 5/005* (2013.01); *B23K 2101/001* (2018.08); *B23K 2103/08* (2018.08);
(Continued)

(58) Field of Classification Search
CPC ........ B23P 6/045; B23K 1/0018; B23K 1/206
See application file for complete search history.

(56) References Cited

U.S. PATENT DOCUMENTS 3,260,619 A * 7/1966 Shoemaker .............. C23G 1/28
134/3
4,098,450 A * 7/1978 Keller .................... B23K 9/235
228/119
(Continued)

FOREIGN PATENT DOCUMENTS

EP 1312437 A1 5/2003
EP 1424158 A1 6/2004
(Continued)

OTHER PUBLICATIONS

JP-2003001478-A machine translation (Year: 2003).*
European Search Report issued in connection with corresponding Eurpean application No. 17185841.8 filed Aug. 11, 2017.

*Primary Examiner* — Jacob J Cigna
*Assistant Examiner* — Michael W Hotchkiss
(74) *Attorney, Agent, or Firm* — James Pemrick; Hoffman Warnick LLC

(57) ABSTRACT

A method of repairing a superalloy component includes a series of sequential steps. The steps are, cleaning the component, applying brazing material to the component, heat treating the component, inspecting the component, preparing the surface of the component, welding the component, and performing a second inspection of the component. The superalloy component is comprised of a high gamma prime superalloy.

14 Claims, 4 Drawing Sheets

(51) Int. Cl.
  *B23K 26/34* (2014.01)
  *B23K 26/00* (2014.01)
  *B23K 31/12* (2006.01)
  *B23K 26/0622* (2014.01)
  *F01D 5/00* (2006.01)
  *B23P 6/00* (2006.01)
  *B23K 26/342* (2014.01)
  *B23K 26/60* (2014.01)
  *B23K 1/20* (2006.01)
  *B23K 26/32* (2014.01)
  *B23K 35/30* (2006.01)
  *B23K 101/00* (2006.01)
  *B23K 103/18* (2006.01)
  *B23K 103/08* (2006.01)

(52) U.S. Cl.
  CPC .... *B23K 2103/26* (2018.08); *F05D 2230/232* (2013.01); *F05D 2230/237* (2013.01); *F05D 2230/40* (2013.01); *F05D 2230/80* (2013.01); *F05D 2260/80* (2013.01); *F05D 2300/175* (2013.01)

(56) References Cited

U.S. PATENT DOCUMENTS

| | | | | |
|---|---|---|---|---|
| 4,285,459 A * | 8/1981 | Baladjanian | | B22F 1/0003 228/119 |
| 4,381,944 A * | 5/1983 | Smith, Jr. | | B22F 1/0003 228/119 |
| 4,566,939 A * | 1/1986 | Miller | | B23K 1/206 134/2 |
| 5,071,054 A * | 12/1991 | Dzugan | | C21D 10/00 228/119 |
| 5,071,486 A * | 12/1991 | Chasteen | | C23F 1/44 134/2 |
| 5,437,737 A * | 8/1995 | Draghi | | B23K 35/025 148/23 |
| 5,806,751 A * | 9/1998 | Schaefer | | B23K 1/0018 228/119 |
| 6,450,183 B1 * | 9/2002 | Cole | | C23G 1/14 134/2 |
| 6,495,793 B2 * | 12/2002 | Tewari | | B23K 26/34 219/121.64 |
| 6,530,971 B1 * | 3/2003 | Cohen | | B23K 35/0244 148/24 |
| 6,575,349 B2 * | 6/2003 | Van Esch | | B23K 1/0018 228/119 |
| 6,998,568 B2 * | 2/2006 | Brehm | | B23K 1/0056 219/121.62 |
| 7,010,987 B2 * | 3/2006 | Antonelli | | B23K 31/12 73/788 |
| 7,360,678 B2 * | 4/2008 | Pietruska | | B23P 6/007 228/119 |
| 7,824,510 B2 * | 11/2010 | Hu | | B23K 35/3033 148/528 |
| 8,141,769 B2 * | 3/2012 | Ott | | B23K 1/0018 228/119 |
| 9,664,049 B2 * | 5/2017 | Georgieva | | F01D 9/041 |
| 10,024,161 B2 * | 7/2018 | McCall | | C23C 28/021 |
| 10,076,811 B2 * | 9/2018 | Ozbaysal | | B23P 6/045 |
| 10,279,416 B2 * | 5/2019 | Whims | | B23K 9/0026 |
| 10,279,438 B2 * | 5/2019 | Ozbaysal | | B22F 5/009 |
| 2005/0015980 A1 * | 1/2005 | Kottilingam | | B23K 10/027 29/888.011 |
| 2005/0067466 A1 * | 3/2005 | Boegli | | B23K 26/32 228/119 |
| 2006/0091182 A1 * | 5/2006 | Ivory | | C11D 7/08 228/101 |
| 2006/0200963 A1 * | 9/2006 | Lutz | | F01D 5/005 29/402.16 |
| 2008/0017694 A1 * | 1/2008 | Schnell | | B23K 35/304 228/119 |
| 2012/0096713 A1 * | 4/2012 | Manjooran | | F01D 5/005 29/889.1 |
| 2013/0320073 A1 * | 12/2013 | Yokoo | | B23K 1/0008 228/233.2 |
| 2014/0209576 A1 * | 7/2014 | Ozbaysal | | C23C 24/106 219/121.64 |
| 2015/0040364 A1 * | 2/2015 | Ogasahara | | B23P 6/04 29/402.07 |
| 2015/0048058 A1 * | 2/2015 | Bruck | | B23K 26/34 219/76.14 |
| 2015/0125281 A1 * | 5/2015 | Georgieva | | B23K 35/36 415/200 |

FOREIGN PATENT DOCUMENTS

| | | |
|---|---|---|
| EP | 1972408 A2 | 9/2008 |
| EP | 2868426 A2 | 5/2015 |
| JP | 2003001478 A * | 1/2003 |
| JP | 2003001478 A | 1/2003 |

* cited by examiner

METHOD OF REPAIRING SUPERALLOYS

BACKGROUND OF THE INVENTION

This invention relates to joining technology generally, and specifically, to a repair or service method for damaged components fabricated of high gamma prime superalloys.

Rene 108 is one superalloy that is becoming a desired material of choice for blades, nozzles, and shrouds in advanced gas turbines. Rene 108 and other high gamma prime superalloys have excellent mechanical and oxidation properties at elevated temperatures. However, Rene 108 and other high gamma prime superalloys have poor weldability and are some of the hardest to weld materials in the superalloy category. Welding high gamma prime superalloys using any traditional welding procedures results in significant cracking in the weld metal and base metal heat-affected zone. Undesirable cracks along the weld line lead to unacceptable welds.

BRIEF DESCRIPTION OF THE INVENTION

In an aspect of the present disclosure, a method of repairing a superalloy component includes a series of sequential steps. The steps are, cleaning the component, applying brazing material to the component, heat treating the component, inspecting the component, preparing the surface of the component, welding the component, and performing a second inspection of the component. The superalloy component is comprised of a high gamma prime superalloy.

In another aspect of the present disclosure, a method of servicing a superalloy component comprised of a high gamma prime superalloy is provided. The method includes the following sequential steps, (a) cleaning the component with a salt bath immersion followed by fluoride ion cleaning, (b) applying brazing material to the component, (c) heat treating the component, (d) inspecting the component, (e) preparing the surface of the component, (f) welding the component, the welding performed with a pulse modulated laser source and a wire weld filler material, (g) recontouring a welded area of the component, and (h) performing a second inspection of the component.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
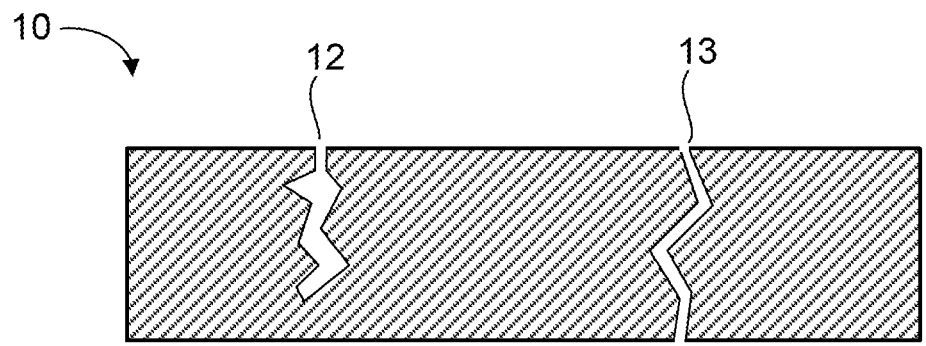
FIG. 1 illustrates a cross-section of a high gamma prime superalloy component with cracks or defects in the component.

FIG. 1 illustrates a high gamma prime superalloy component 10 with cracks or defects 12, 13 formed in the component. The component 10 may be a turbomachine airfoil or part, or any other suitable part comprised of a superalloy. The superalloy may be formed of a conventionally cast (CC), directionally solidified (DS) or single crystal (SX) material. The crack 12 is an example of a branched crack that does not go all the way through the component. Crack 13 is an example of a crack that extends completely through the component. Cracks or defects may be straight or characterized by a complex shape (e.g. branched). Examples of high gamma prime superalloys are Rene 108 (Balance Ni, 0.07% C, 8% Cr, 9% Co, 0.5% Mo, 3.2% Ta, 0.7% Ti, 5.6% Al, 0.015% B, 0.01% Zr 1.4% Hf), CM 247 (also known as Rene 108), Mar M 247 (Balance Ni, 0.15% C, 15.5% Cr, 9.5% Co, 2% Mo, 3.8% W, 2% Nb, 1.8% Ti, 4.3% Al, 0.015% B, 0.05% Zr), Udimet 700 (Balance Ni, 0.07% C, 15% Cr, 18.5% Co, 5% Mo, 3.5% Ti, 4.4% Al, 0.025% B), Inconel 939 (Balance Ni, 0.15% C, 22.4% Cr, 19% Co, 1.6% W, 1% Nb, 1.4% Ta, 3.7% Ti, 1.9% Al, 0.01% B, 0.1% Zr), Inconel 738 (Balance Ni, 0.09-0.17% C, 16% Cr, 8.5% Co, 1.7% Mo, 2.5% W, 0.8% Nb, 1.7% Ta, 3.5% Ti, 3.5% Al, 0.01% B, 0.0500.1% Zr), Rene 80 (Balance Ni, 0.16% C, 14% Cr, 9.5% Co, 4% Mo, 4% W, 5% Ti, 3% Al, 0.015% B, 0.03% Zr), GTD 444 (Balance Ni, 0.1% C, 0.75% Cr, 7.5% Co, 1.5% Mo, 6% W, 4.8% Ta, 3.6% Ti, 4.23% Al), B-1900, GTD-111, Inconel 100, Inconel 713, Inconel 738, Inconel 792, MAR-M-246, MAR-M-509, Rene 77, Rene 125, U-500, and CMSX single crystal alloys. All element percent (%) values are weight percent.

Figure 2:
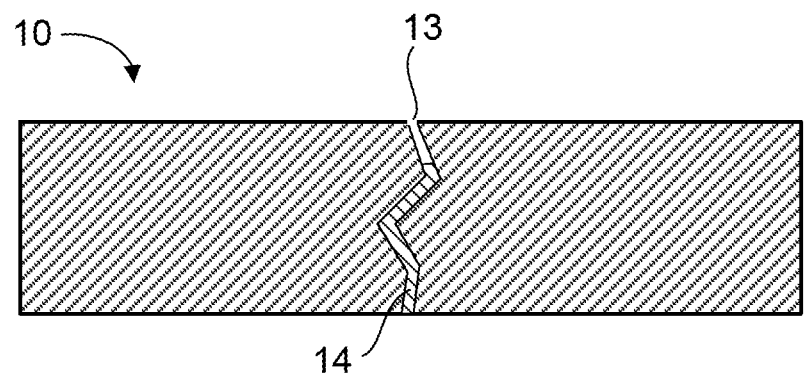
FIG. 2 illustrates a cross-section of the component after brazing.

With reference now to FIG. 2, the component 10 has had braze material (e.g., a braze alloy or braze paste) applied and has undergone a brazing heat treatment. The braze material 14 has flowed into the crack 13, but not all of crack 13 is filled. The brazing operation was partly successful. This unfilled region of crack 13 will be indicated by an inspection process.

Figure 3:
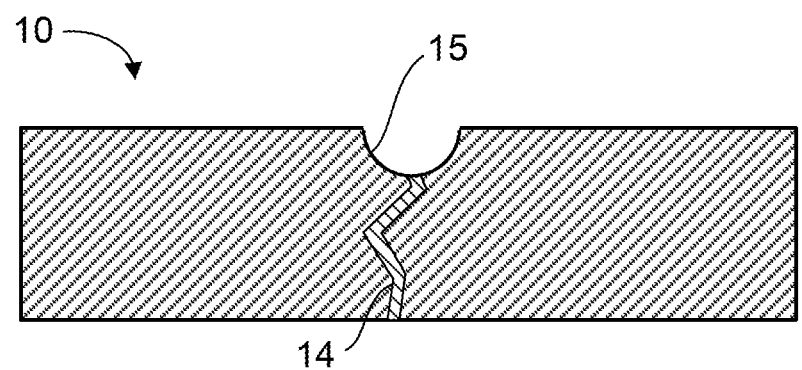
FIG. 3 illustrates a cross-section of the component after surface preparation.

FIG. 3 illustrates a cross-sectional view of a partially repaired component 10. The unfilled region of crack 13 has been machined (or grinded) into a semi-circular groove 15.

The groove 15 is then subsequently filled in with a filler material/metal, such as weld wire, and welded with a modulated pulsing laser source. In this disclosure, welding is defined as pulsed modulation laser welding with wire as the weld filler material, and welding does not include laser cladding (where a powder is fed into a focused laser beam as it is scanned across the target surface, leaving behind a deposited coating of the chosen material).

Figure 4:
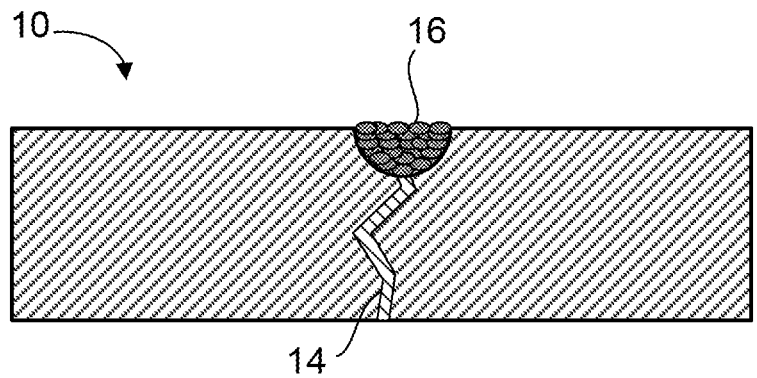
FIG. 4 illustrates a cross-section of the component after welding.

FIG. 4 illustrates a cross-sectional view of the repaired component 10. The unfilled region of crack 13 that was machined (or ground) into a semi-circular groove has now been filled in with a filler metal 16 (such as weld wire), and welded with a modulated pulsing laser source. The groove 15 is repeatedly welded and filled with weld filler until the groove is filled to the desired amount.

Figure 5:
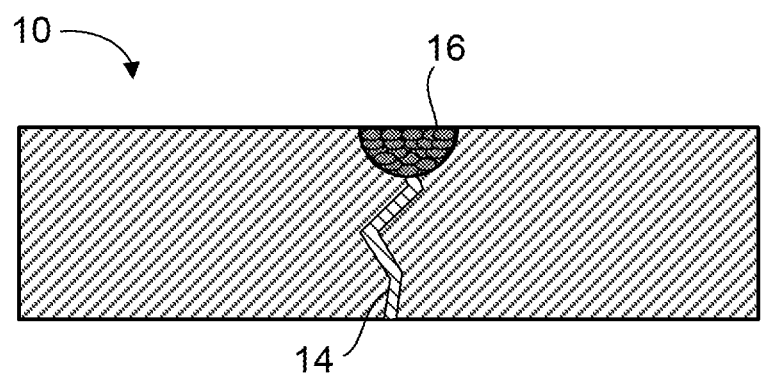
FIG. 5 illustrates a cross-section of the component after recontouring.

FIG. 5 illustrates a cross-sectional view of the repaired component 10. The excess weld filler material 16 has been machined away in a final finishing or recontouring step. The crack 13 has now been filled in with the filler metal 16 (such as weld wire), welded with a modulated pulsing laser source and the surface of the repair has been recontoured to the desired profile.

Figure 6:
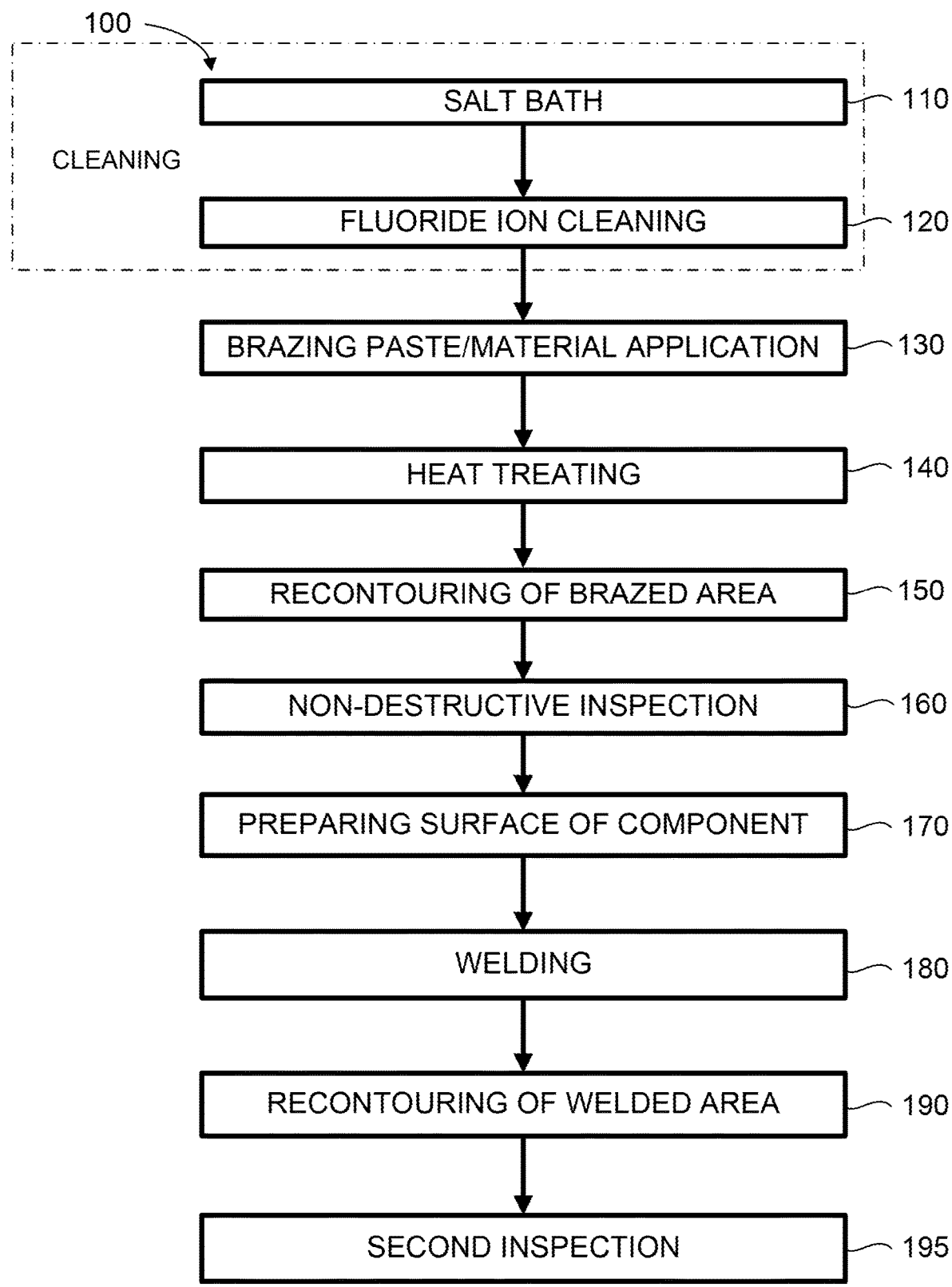
FIG. 6 illustrates a flowchart of the method of repairing or welding a superalloy component.

FIG. 6 is a flowchart of the method 100 of welding or repairing the superalloy component 10. The following steps are performed sequentially. The method 100 includes a cleaning step 110 that immerses the component 10 in the salt bath. The salt bath is a preliminary cleaning process applied generally after removal of the consumed protective metallic coating and, in some components, of the thermal barrier coating. The salt bath removes tenacious and thermodynamically stable oxidation and to some extent also corrosion products from cracks and from the components' surface. Uncoated parts, which also have been subjected to strong thermo-mechanical fatigue (TMF) degradation and erosion impact, may also need a salt bath to remove these contamination scales. The salt bath reduces the thickness of the oxide surface scales by 70% to 90%, and removes inner oxidation products from cooling holes and cavities. Contaminants such as oil, grease etc., can also be dissolved.

Salt bath cleaning is carried out in a discontinuous process in which the components 10 are charged in chemically resistant baskets and immersed for a predetermined time in the molten salt bath. Salt baths for metal oxide removal may be primarily composed of sodium hydroxide and differing amounts of strongly oxidizing agents, such as sodium nitrate. Some catalysts are also added to the salt bath to accelerate and control the oxidizing properties of the salt bath. Additional compounds may also be added to protect the base metal from undesired chemical attack. The salt bath is preferred to have the lowest possible viscosity during the entire component exposure time to be able to penetrate cracks and internal cavities. The salt bath used for metal oxide removal may operate in a temperature range of about 400° C. to about 500° C. In the case of Rene 108, the salt bath is highly desired, since the cracks are deeply oxidized and the successive cleaning step, so-called "fluoride ion cleaning" (FIC), alone would not be sufficient to remove all oxides.

A second cleaning step 120 employs dynamic sub-atmospheric fluoride ion cleaning (FIC), which is a highly effective process for the removal of deeply embedded oxides from superalloys containing significant amounts of aluminum and titanium. The combination of salt bath, followed by FIC, leads to an effective brazing repair. The cleaning effect is based on chemical reactions, such as the conversion of thermodynamically highly stable metal oxides in reducible fluorides as well as the formation of volatile metal fluorides. These reactions take place in a reactor, which is heated up to a temperature range of about 900° C. to about 1200° C., with pressures between about 50 Torr and about 765 Torr. Gases (e.g., Argon (Ar), hydrogen ($H_2$) and/or hydrogen fluoride (HF)) are injected in sequence to allow a reaction and reduction of the metal oxides. Finally, the extraction of the gaseous reaction products is obtained by evacuating the system. This last step is important since the chemical reactions described represent dynamic equilibria. It means that they reach the product side to some extent and are easily reversed if the chemical reaction products (metal fluorides and water) are not removed continuously during the process cycle. The cracks must be supplied with fresh reaction gases through intermediate evacuation steps of the reactor volume.

A FIC process is a sequence of cleaning cycles, which is tailored according to the specific alloy, the degree of damage and the component. Excessive material attack, especially in terms of aluminum, titanium and yttrium depletion, as well as attack of sensitive areas and brazed joints, must be avoided since it could lead to a reduction of the mechanical properties or oxidation resistance of the base metal. On the other hand, the wetting behavior of the braze alloy is improved by the depletion of the cleaned surface (elements like titanium, which easily oxidize, can prevent from wetting). In the specific case of Rene 108, cleaning is very challenging since the cracks are very long (typically >4 mm) and strongly oxidized. The flow time of HF gas is strongly related to the length of the cracks and for this reason a specific long FIC process is applied in case of Rene 108 to be able to clean up to the bottom of the cracks.

The effectiveness of the FIC process is assessed by investigating characteristic metallurgical criteria: mainly the depth of the material attack and the oxide removal from the cracks. Oxide scales should be completely removed from crack surfaces and from wide accessible cracks. In extremely fine cracks, difficult to be accessed by the process gas, a certain amount of local residual oxides can be tolerated. Grain boundaries carbide attack and generally IGA can occur and is tolerated according to threshold values defined for the specific cases. The FIC process is considered one of the most reliable methods to remove oxides from cracked material, even in case of very fine thermomechanical fatigue cracks. For this reason, combined with a suitable brazing process, it can be used to repair even highly loaded areas of components.

In step 130 a brazing paste is applied to the component. High temperature brazing has been successfully implemented in the gas turbine industry to repair superalloy components in high loaded areas and even in critical components such as rotating parts. The main aim was reducing the scrap rate by extending the range of repairable parts. Compared to welding, the brazing process avoids distortions and therefore retains the shape of a component thanks to the uniform heating and cooling of the components in the vacuum furnace during brazing. Brazing, according to the method described herein, yields joints characterized by high temperature strength, excellent creep, excellent low cycle fatigue (LCF) properties, as well as oxidation resistance on the repaired locations. A suitable nickel-based brazing alloy may have the following composition (by weight percent): Nickel balance, Chromium 13% to 17%, Cobalt 8% to 12%, Tantalum 2% to 5%, Aluminum 4% to 7%, Boron<4%, Yttrium<0.5%. The braze material may be a pure braze alloy, e.g., D-15 (Balance Ni, 15% Cr, 10.25% Co, 3.5% Ta, 3.5% Al, 2.3% B), AMS 4782 (71% Ni, 19% Cr, 10% Si), DF-4B (Balance Ni, 14% Cr, 10% Co, 3.5% Al, 2.75% B, 2.5% Ta, 0.05% Y), Amdry 788 (Balance Co, 22% Cr, 21%

Ni, 14% W, 2% B, 2% Si, 0.03% La) or also a mixture of brazing alloys like AMS 4782 and a powder of the superalloy Inconel 738, Inconel 625, Inconel 718, Haynes 230 (57%-Balance Ni, 22%, Cr, 14% W, 2% Mo, 3% max Fe, 5% max Co, 0.5% Mn, 0.4% Si, 0.5% max Nb, 0.3% Al, 0.1% max Ti, 0.1% C, 0.02% La, 0.015% max B), MM509B, Amdry 775, braze alloy high melt/low melt mixtures, 50% Ni/50% D15, 60% IN625/40% Amdry 788, or 50% MarM 247/50% DF-4B.

The brazing alloy may be mixed with binders (e.g., between 8% and 12%) and then applied on the top of the crack. In case of wide cracks, a second layer of brazing paste may be applied on top of the first layer of brazing paste. This second layer is a mixture of brazing alloy and a gap filler. The gap filler may be a nickel based superalloy with a similar or equivalent composition to the base metal (e.g., MarM247). For Rene 108, the gap filler would be very similar or identical material (i.e., Rene 108). The powder is mixed with the binder and finally applied on the surface of the component. Additional brazing alloy application steps should allow filling of wide cracks without unacceptable porosity. Non-limiting examples of other suitable filler materials are GTD-262, Rene 41 (Balance Ni, 0.09% C, 19% Cr, 11% Co, 9.75% Mo, 3.15% Ti, 1.65% Al, 0.005% B), GTD-111, Rene 108LC, Inconel 738, Inconel 738LC, and GTD-222.

The design of some superalloy components may allow the application of the brazing paste on the cracks from two sides of the crack, or opposing component surfaces. Brazing paste can be injected directly on the internal surface of the component. The "double-sided" application of brazing paste permits even stronger repairs. After applying the brazing alloy paste, stop-off may be put around the areas to be brazed to avoid excessive flowing of the brazing paste in locations where brazing is not desired. In case of cracks close to cooling holes, metallic pins covered with ceramic can be inserted in the cooling air holes to avoid their closure due to the flow of the brazing alloy.

In step 140, the components are brazed and heat treated. The components may be put in a high vacuum furnace. The position of the parts depends on the cracks' orientation and generally the parts are positioned in the way that the weight force, combined with the capillary force, facilitates the flow of the brazing alloy in most of the cracks to be brazed. The brazing process runs in high vacuum. The furnace system will be slowly heated up to a temperature range of about 200° C. to about 400° C. During this first heating phase the binder gradually evaporates and leads to a slight shrinkage of the brazing paste. After this short dwell time meant to eliminate most of the binder, the temperature continues to gradually increase. After reaching a sufficiently high temperature to completely melt the brazing alloy and homogenize the mixture of powder, the temperature will be lowered between the liquidus and the solidus temperature. There during a long dwell time (e.g., >3 hours) the front of the liquid phases will be slowly shifted due to the diffusion of melting point depressant elements into the base metal. The described mechanism is generally defined as diffusion brazing or transient liquid phase brazing (TLP brazing). For a Rene 108 example, the dwell time at the intermediate temperature between solidus and liquidus temperature and the temperature higher than the liquidus temperature should be prolonged (e.g., 12 hours) compared to other nickel based superalloys, single crystal (SX) material included, since due to Rene 108's typically very long cracks, complete filling is difficult in the generally chosen time for the above-mentioned scenarios.

Figure 7:
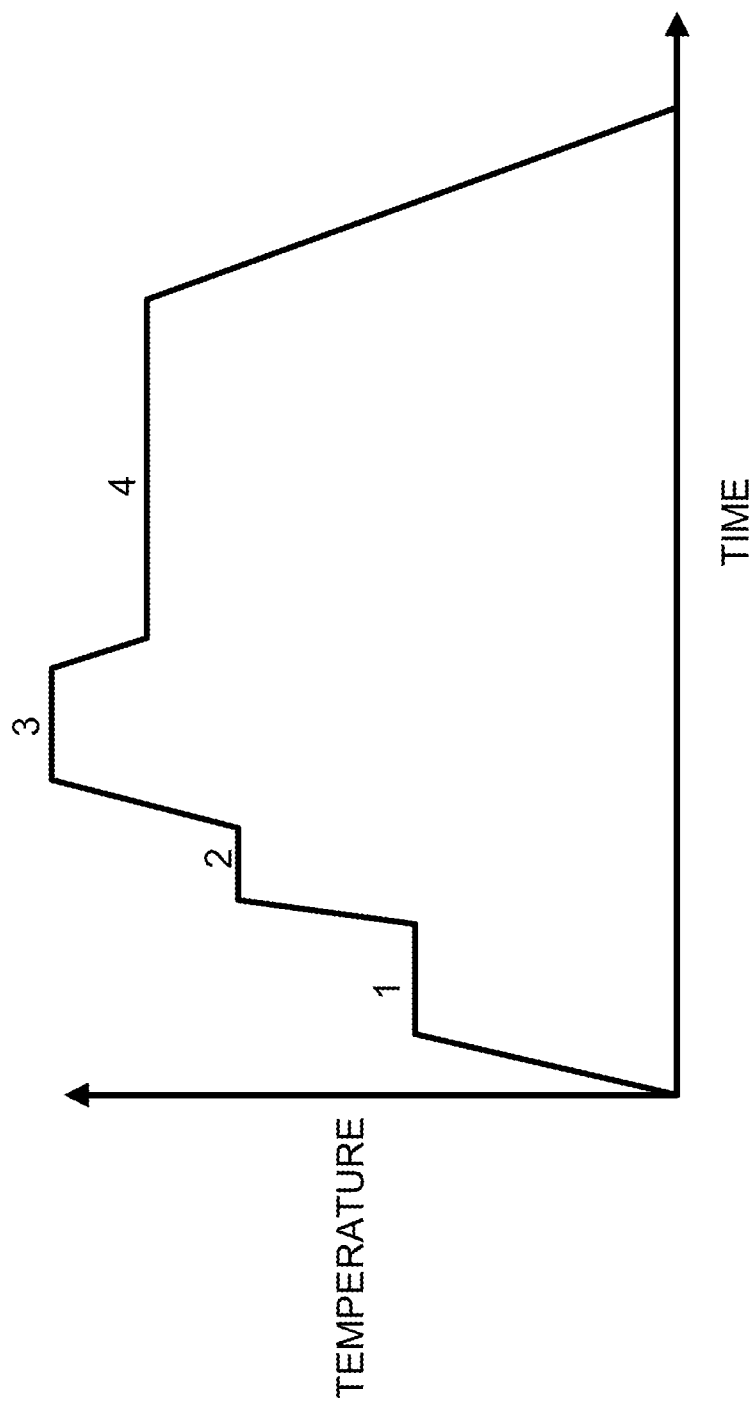
FIG. 7 illustrates a graph of a heat treatment cycle.

FIG. 7 illustrates a chart of one example braze/heat treatment cycle. The chart is not to scale. The components are heated to a first temperature and held there for a first predetermined time. This is indicated by numeral 1. A second heating phase heats the components to a second temperature and this second temperature is held for a second period of time. The second temperature is greater than the first temperature. This is indicated by numeral 2. A third heating phase heats the components to a third temperature and this third temperature is held for a third predetermined time. The third temperature is higher than the second temperature. This is indicated by numeral 3. The components are allowed to cool to a fourth temperature and the components are held at this temperature for a fourth predetermined time. The fourth temperature is lower than the third temperature, but higher than the first temperature. This is indicated by numeral 4. The final phase is a cooling of the components back to room temperature.

In step 150, a recontouring of the brazed area is performed. The evaporation of binder is normally compensated by a generous brazing deposition. Nevertheless, in case of several long and through-going cracks typical for Rene 108 components, the described shrinkage can easily lead to insufficient filling of cracks, especially on the top. Such defects can be recognized mainly in the machining step after brazing. There excessive brazed material is removed by machining or slightly hand grinding to restore the original or desired geometry on the component surface. This process is called "recontouring" or "blending".

In step 160, a non-destructive test (NDT) is performed on the component. A suitable NDT inspection method for defects detection is fluorescent penetrant inspection (FPI). A fluorescent dye is applied to the surface of part (the entire component or only the zone of interest) in order to detect defects that may compromise the integrity or quality of the part in question. FPI may include the following sequential steps, initial cleaning, penetrant application, excess penetrant removal, developer application, inspection and final cleaning. Before the penetrant can be applied to the surface of the component, it must be ensured that the surface thereof is free of any contamination such as oil, dirt, or scale that may fill a defect or falsely indicate a flaw. This process of cleaning is important because if the surface of the part is not properly prepared to receive the penetrant, a defective component may be moved on for further processing. In penetrant application, the fluorescent penetrant is applied to the surface of the component. Depending on the type of penetrant, a defined time (so-called "dwell time") is required for the penetrant to seep into flaws or defects in the component. Dwell time varies by material and the size of the indications that are intended to be identified but is generally less than 30 minutes. It requires much less time to penetrate larger flaws because the penetrant is able to soak in much faster. In the excess penetrant removal step, after the mentioned dwell time has passed, penetrant on the outer surface of the material is then removed. This highly controlled process ensures that the penetrant is removed only from the surface of the material and not from inside any identified flaws. In the developer application step, once the excess penetrant is removed, a contrasting developer is applied to the surface of the component. This serves as a background against which flaws can easily be detected. The developer also causes penetrant bleeding from any defects. These two attributes allow defects to be easily detected upon inspection. The inspection step identifies the defects. To detect defects, an inspector will use ultraviolet (UV) radiation with an appropriate intensity to inspect. This takes place in a dark room to ensure good contrast between the glow emitted by the penetrant in the defected areas and the unlit surface of the material. The inspector carefully examines all surfaces in question and assesses the detected defects according to the predetermined standards. Areas in question may be marked so that location of indications can be identified easily without the use of the UV lighting. Post inspection, and upon successful inspection of the product, the component is returned for a final cleaning before it is moved on to another process, or deemed defective and reworked or scrapped. The component may be cleaned in ultrasound bath to completely remove the FPI remains.

In step 170, the surface of the component is prepared for the second repair phase. This will occur if any defects were found in the previous inspection step 160. Local machining or grinding of areas containing defects is performed. These machined areas should have a clean and regular shape area, which is desired for reliable pulsed laser welding. The entire defected area may be manually machined/ground by means of a hand grinder with a tip diameter properly defined based on the required grinding depth. The area may also be machined by a computer controlled machine (e.g., a CNC machine). The grinding depth is defined in accordance to braze defect depth, if it can be recognized, component geometry (e.g. wall thickness) and scope of repair in general. Because of the limited area and depth of the welding repair related to proposed repair scope, a tip of about 3 mm diameter or more and a grinding depth of about 0.5 mm or more is normally enough. However, other diameters and depths may be required in some applications. The ground area has the shape of grooves with round contours at the beginning and end zone, and a radius of curvature of about 1.5 mm or more. The previously brazed zone should be located as near as possible to the center of the grooves to have a homogenous heat dispersion and stress distribution during the following laser wire welding process.

In welding step 180, the previously machined grooves are filled with filler material. Pulsed laser welding is a joint technique where the weld filler is provided in the form of a wire (e.g., diameter of about 0.4 to 1 mm). Other wire diameters may be used as desired. The wire is in contact with the surface that needs to be joined and melted by means of direct exposure to the pulse modulated laser light. The generated heat on the molten wire is directly transferred into the base material that will be partially melted as the bonding is established. Because of the pulsing nature of the process the fused zone is limited to the laser exposed zone with limited heat input because of the fine control on the overall pulse energy, duration and intensity distribution of the laser. An advantage of the process is the extremely low heat input and the laser's limited temperature distribution during the welding because of the pulse modulation. The pulsed modulation of the laser creates a small heat affected zone and so, a low dilution or intermixing zone of the base metal. These features allow welding of complex materials (e.g. brazed material, high gamma prime materials) and/or critical geometries with almost no retained stress after welding. Therefore, no heat treatments are required before and after welding. To prevent oxidation during the operation, the welded area is shielded with inert gas (e.g., argon or nitrogen). The residual gas produced during the welding process is extracted by means of an exhaust system located near the welded area. Additional advantages of this technique are the high position accuracy due to multi-axis CNC machines and process flexibility. The required area extension and the welding path are programmable by means of the machine software interface that allows welding bath execution over X, Y and Z dimensions.

In the example where the machined grooves need to be filled, a first layer is melted on the bottom part of the groove (usually in direct contact with the brazing paste) for the entire groove length, and subsequent layers are built on top of the first one with an appropriate X, Y and Z shift (according to weld bead dimension, groove radius of curvature) until the groove is satisfactorily filled.

The main process parameters of pulsed laser wire welding and their correlation with welding quality are described as follows. Laser peak power may be between about 0.1 kW to about 3 kW. Wire diameter is between about 0.4 mm to 1 mm. Laser pulse duration may be between about 10 ms to 100 ms. Process parameters above or below these ranges may also be employed, as desired in the specific application. Pulse shape is defined according to the base material sensitivity to cracks and weldability in general. An important parameter is the appropriate modulation of process heat input and stress releasing. Laser frequency may be between about 1 Hz to about 50 Hz. Translation speed is the speed of the laser head during the welding execution, and should be chosen in combination with the laser frequency in order to achieve the desired target spot to spot overlap. A second recontouring step 190 may be performed on the welded area to return the surface of the component to the desired profile. This is similar to step 150, described above. A second inspection step 195 may be performed to verify that all defects have been filled and repaired. This is similar to step 160, described above.

One additional advantage of the method 100, which incorporates pulse modulated laser wire welding, described herein is that very limited grinding effort is required because of the near net shape nature of this welding execution. Laser wire welding generates very little, if any, over welded areas. This results in a huge benefit in term of time, cost and expense.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of repairing a superalloy component, the method comprising the following sequential steps performed in sequential order:
   (a) cleaning the component;
   (b) applying brazing material to the component;
   (c) heat treating the component;
   (d) inspecting the component;
   (e) preparing the surface of the component;
   (f) welding the component;
   (g) recontouring a surface of the component to obtain a desired profile or shape; and
   (h) performing a second inspection of the component,
   wherein the welding the component includes welding with a pulse modulated laser source and a wire weld filler material to form a welded area,
   wherein the recontouring step includes machining a surface of the component at the welded area to obtain the desired profile or shape,
   wherein the heat treating step includes:
   heating the component to a first temperature and holding the component at the first temperature for a first predetermined time;
   heating the component to a second temperature and holding the component at the second temperature for a second predetermined time, the second temperature being higher than the first temperature;
   heating the component to a third temperature and holding the component at the third temperature for a third predetermined time, the second temperature being lower than the third temperature; and
   cooling the component;
   wherein the cleaning step includes:
   immersing the component in a salt bath, and subsequently cleaning the component with a fluoride ion cleaning process; and the salt bath includes sodium hydroxide and an oxidizing agent, and the salt bath having a temperature range of about 400° C. to about 500° C.; and
   the fluoride cleaning process is performed in a temperature range of about 900° C. to about 1,200° C., a pressure range between about 50 Torr and about 765 Torr, and using injection gas including one or more of hydrogen and hydrogen fluoride being injected in sequence to allow a reaction and reduction of metal oxides.

2. The method of claim 1, the applying brazing material step further includes:
   the brazing material comprising a nickel based braze alloy having the following composition by weight percent, balance Nickel, about 13%-17% Chromium, about 8%-12% Cobalt, about 2%-5% Tantalum, about 4%-7% Aluminum, about <4% Boron, and about <0.5% Yttrium.

3. The method of claim 1, the inspecting step includes:
   performing a non-destructive test of the component, wherein the non-destructive test comprises a fluorescent penetrant inspection.

4. The method of claim 1, the performing a second inspection of the component step includes a fluorescent penetrant inspection.

5. The method of claim 1, the superalloy component includes gamma prime superalloy.

6. The method of claim 5, the gamma prime superalloy includes at least one of:
   B-1900, GTD-111, Inconel 100, Inconel 713, Inconel 738, Inconel 792, Inconel 939, MAR-M-246, MAR-M-509, Rene 77, Rene 108, Rene 125, or U-500, CM 247, Mar M 247.

7. A method of repairing a superalloy component, the method comprising the following sequential steps performed in sequential order:
   (a) cleaning the component;
   (b) applying brazing material to the component;
   (c) heat treating the component;
   (d) inspecting the component;
   (e) preparing the surface of the component;
   (f) welding the component;
   (g) recontouring a surface of the component to obtain a desired profile or shape and
   (h) performing a second inspection of the component,
   wherein the welding the component includes welding with a pulse modulated laser source and a wire weld filler material to form a welded area,
   wherein the recontouring includes machining a surface of the component at the welded area to obtain a desired profile or shape, and
   wherein the cleaning step includes:
   immersing the component in a salt bath, and subsequently cleaning the component with a fluoride ion cleaning process, and
   the preparing the surface step further includes:
   based on results of the preceding inspecting step, machining one or more grooves with round contours located as near as possible to a center of the applied braze material to have a homogenous heat dispersion and stress distribution during the welding in the component;
   wherein the cleaning step includes:
   immersing the component in a salt bath, and subsequently cleaning the component with a fluoride ion cleaning process; and the salt bath includes sodium hydroxide and an oxidizing agent, and the salt bath having a temperature range of about 400° C. to about 500° C.; and
   the fluoride cleaning process is performed in a temperature range of about 900° C. to about 1,200° C., a pressure range between about 50 Torr and about 765 Torr, and using injection gas including one or more of hydrogen and hydrogen fluoride being injected in sequence to allow a reaction and reduction of metal oxides.

8. The method of claim 7, wherein the grooves are at least about 0.5 mm deep and have a radius of curvature of at least about 1.5 mm.

9. A method of servicing a superalloy component comprised of a gamma prime superalloy, the method comprising the following sequential steps performed in sequential order:
   (a) cleaning the component with a salt bath immersion followed by fluoride ion cleaning;
   (b) applying brazing material to the component;
   (c) heat treating the component;
   (d) inspecting the component;
   (e) preparing the surface of the component;
   (f) welding the component, the welding performed with a pulse modulated laser source and a wire weld filler material;
   (g) recontouring a welded area of the component, wherein the recontouring includes machining a surface of the component at the welded area to obtain a desired profile or shape, and (h) performing a second inspection of the component, wherein the heat treating step includes:

heating the component to a first temperature and holding the component at the first temperature for a first predetermined time;

heating the component to a second temperature and holding the component at the second temperature for a second predetermined time, the second temperature being higher than the first temperature;

heating the component to a third temperature and holding the component at the third temperature for a third predetermined time, the second temperature being lower than the third temperature; and cooling the component;

wherein the cleaning step includes:

immersing the component in a salt bath, and subsequently cleaning the component with a fluoride ion cleaning process; the salt bath includes sodium hydroxide and an oxidizing agent, and the salt bath having a temperature range of about 400° C. to about 500° C.; and the fluoride cleaning process is performed in a temperature range of about 900° C. to about 1,200° C., a pressure range between about 50 Torr and about 765 Torr, and using injection gas including one or more of hydrogen and hydrogen fluoride being injected in sequence to allow a reaction and reduction of metal oxides.

10. The method of claim 9, the gamma prime superalloy includes at least one of: B-1900, GTD-111, Inconel 100, Inconel 713, Inconel 738, Inconel 792, Inconel 939, MAR-M-246, MAR-M-509, Rene 77, Rene 108, Rene 125, or U-500, CM 247, Mar M 247.

11. The method of claim 10, the applying brazing material step further includes:

the brazing material comprising a nickel based braze alloy having the following composition by weight percent, balance Nickel, about 13%-17% Chromium, about 8%-12% Cobalt, about 2%-5% Tantalum, about 4%-7% Aluminum, about <4% Boron, and about <0.5% Yttrium.

12. The method of claim 10, the inspecting step includes:

performing a non-destructive test of the component, wherein the non-destructive test comprises a fluorescent penetrant inspection.

13. The method of claim 10, the preparing the surface step further includes:

based on results of the preceding inspecting step, machining one or more grooves with round contours located as near as possible to a center of the applied braze material to have a homogenous heat dispersion and stress distribution during the welding in the component.

14. The method of claim 10, further includes an initial recontouring step performed after the heat treating step, the initial recontouring step machining a brazed surface of the component to obtain a desired profile or shape.

\* \* \* \* \*